United States Patent
Terada et al.

(10) Patent No.: US 6,463,360 B1
(45) Date of Patent: Oct. 8, 2002

(54) MOBILE ROBOT, AUTOMATED PRODUCTION SYSTEM, AND MOBILE ROBOT SYSTEM

(75) Inventors: Hiroyuki Terada, Nishio; Hajime Ohta, Anjo; Tomoyuki Hirota, Okazaki; Kazuhisa Fukaya, Anjo; Tsuyoshi Ueyama, Chiryu; Yutaka Inoue, Kariya; Takashi Sato, Nagoya, all of (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 09/538,498

(22) Filed: Mar. 30, 2000

(30) Foreign Application Priority Data

Oct. 26, 1999 (JP) ............................................. 11-304001

(51) Int. Cl.$^7$ ...................... G05B 19/04; G05B 19/18
(52) U.S. Cl. ...................... 700/257; 700/254; 700/95; 700/117; 700/257; 700/258; 318/580; 318/587; 318/568.12; 701/3; 701/23; 901/1; 901/46; 901/47
(58) Field of Search .................. 700/245, 95, 257, 700/117, 258, 247, 262; 318/580, 587, 568.12; 701/23, 3, 36, 200, 25; 714/46, 47, 57; 342/13, 16; 901/1, 46, 47; 180/168; 706/904

(56) References Cited

U.S. PATENT DOCUMENTS

| | | | | | |
|---|---|---|---|---|---|
| 4,638,445 | A | * | 1/1987 | Mattaboni | 318/568.1 |
| 4,674,048 | A | * | 6/1987 | Okumura | 701/25 |
| 4,875,172 | A | * | 10/1989 | Kanayama | 701/23 |
| 4,940,925 | A | * | 7/1990 | Wand et al. | 318/587 |
| 5,324,948 | A | * | 6/1994 | Dudar et al. | 700/59 |
| 5,715,388 | A | * | 2/1998 | Tsuchihashi | 318/566 |
| 6,122,572 | A | * | 9/2000 | Yavnai | 701/23 |

OTHER PUBLICATIONS trahanias et al., Visual Landmark extraction and recognition for autonomous robot navigation, 1997, IEEE, pp. 1036–1043.*

Jacak et al., Neural netork–based modeling of robot action effects in conceptual state space of real world, 1996, IEEE, pp. 1149–1156.*

"Development of Adaptive Production System (APS) to the Market Uncertainty –Application to automobile starter line–"; DENSO Corporation (with English translation).

* cited by examiner

Primary Examiner—Tan Nguyen
(74) Attorney, Agent, or Firm—Law Office of David G. Posz (57) ABSTRACT

A mobile robot placed on an automatic production line is provided. The mobile robot collects information on operating conditions of other mobile robots placed around it and flow of workpieces on the production line and determines action to be taken next based on the formation. A production system using such a mobile robot and a system inputting an operation program corresponding to a workstation into a mobile robot automatically are also provided. This enables measures to be taken quickly against a change in production, thereby providing a system which achieves high efficiency production.

11 Claims, 12 Drawing Sheets

| FULL LOAD OF WORKPIECES IN FOL. PROCESS | PRESENCE OF WORKPIECES IN CURRENT PROCESS | PRESENCE OF OPERATION RECORD | FOLLOWING PROCESS MOBILE ROBOT | PRECEDING PROCESS MOBILE ROBOT | ACTION SELECTION | SELECTION NUMBER |
|---|---|---|---|---|---|---|
| ON | ON | ON | ON | ON | STAY | 3 |
| ON | ON | ON | ON | OFF | TO FOL. PRO. | 2 |
| ON | ON | ON | OFF | ON | TO PRE. PRO. | 1 |
| ON | ON | ON | OFF | OFF | TO PRE. PRO. | 1 |
| ON | ON | OFF | ON | ON | STAY | 3 |
| ON | ON | OFF | ON | OFF | TO PRE. PRO. | 2 |
| ON | ON | OFF | OFF | ON | TO FOL. PRO. | 1 |
| ON | ON | OFF | OFF | OFF | TO FOL. PRO. | 1 |
| ON | OFF | ON | ON | ON | STAY | 3 |
| ON | OFF | ON | ON | OFF | TO PRE. PRO. | 2 |
| ON | OFF | ON | OFF | ON | TO FOL. PRO. | 1 |
| ON | OFF | ON | OFF | OFF | TO FOL. PRO. | 1 |
| ON | OFF | OFF | ON | ON | STAY | 3 |
| ON | OFF | OFF | ON | OFF | TO PRE. PRO. | 2 |
| ON | OFF | OFF | OFF | ON | TO FOL. PRO. | 1 |
| ON | OFF | OFF | OFF | OFF | TO FOL. PRO. | 1 |
| OFF | ON | ON | ON | ON | RUN ON | 4 |
| OFF | ON | ON | ON | OFF | RUN ON | 4 |
| OFF | ON | ON | OFF | ON | RUN ON | 4 |
| OFF | ON | ON | OFF | OFF | RUN ON | 4 |
| OFF | ON | OFF | ON | ON | RUN ON | 4 |
| OFF | ON | OFF | ON | OFF | RUN ON | 4 |
| OFF | ON | OFF | OFF | ON | RUN ON | 4 |
| OFF | ON | OFF | OFF | OFF | RUN ON | 4 |
| OFF | OFF | ON | ON | ON | STAY | 7 |
| OFF | OFF | ON | ON | OFF | TO PRE. PRO. | 6 |
| OFF | OFF | ON | OFF | ON | TO FOL. PRO. | 5 |
| OFF | OFF | ON | OFF | OFF | TO FOL. PRO. | 5 |
| OFF | OFF | OFF | ON | ON | STAY | 9 |
| OFF | OFF | OFF | ON | OFF | TO PRE. PRO. | 8 |
| OFF | OFF | OFF | OFF | ON | STAY | 9 |
| OFF | OFF | OFF | OFF | OFF | TO PRE. PRO. | 8 |

FIG. 10

| | FOLLOWING PROCESS WORKPIECE | CURRENT PROCESS WORKPIECE | OPERATION RECORD | FOL. PRO. MOBILE ROBOT | FRE. PRO. MOBILE ROBOT | ACTION SELECTION | SELECTION NUMBER |
|---|---|---|---|---|---|---|---|
| (1) | FULL LOAD | — | — | ABSENCE | — | MOVE TO FOL. PRO. | 1 |
| (2) | FULL LOAD | — | — | PRESENCE | ABSENCE | MOVE TO PRE. PRO. | 2 |
| (3) | FULL LOAD | — | — | PRESENCE | PRESENCE | STAY | 3 |
| (4) | NON-LOAD | PRESENCE | — | — | — | KEEP WORKING | 4 |
| (5) | NON-LOAD | ABSENCE | PRESENCE | ABSENCE | — | MOVE TO FOL. PRO. | 5 |
| (6) | NON-LOAD | ABSENCE | PRESENCE | PRESENCE | ABSENCE | MOVE TO PRE. PRO. | 6 |
| (7) | NON-LOAD | ABSENCE | PRESENCE | PRESENCE | PRESENCE | STAY | 7 |
| (8) | NON-LOAD | ABSENCE | ABSENCE | — | ABSENCE | MOVE TO PRE. PRO. | 8 |
| (9) | NON-LOAD | ABSENCE | ABSENCE | — | PRESENCE | STAY | 9 |

— INDICATES ABSENCE OF REQUIREMENT

MOBILE ROBOT, AUTOMATED PRODUCTION SYSTEM, AND MOBILE ROBOT SYSTEM

BACKGROUND OF THE INVENTION

1. Technical Field of the Invention

The present invention relates generally to a mobile robot executing a given operation on workpieces supplied to a production line, an automatic production system using the robot, and a robot system actuating a mobile robot disposed at a workstation by downloading a required operation program thereto.

2. Background Art

Recently, production systems using mobile robots have been proposed which feature multi-workability of the robots and ease with which the production ability is changed by changing the number of the used mobile robots.

Changing the number of mobile robots to be used as a function of the production, however, causes much time to be consumed in changing a control system in an integrated control device integrally controlling the whole operation of a production system.

It is also difficult for such a production system to cure a failure of part of production facilities properly and quickly. The production system has a weakness in that if the integrated control device is failed, it will cause the whole of the system to be disenabled.

Further, altering a job of the mobile robot and moving the mobile robot to another workstation require changing an operation program stored in a robot controller. In a case where operation programs are stored in a plurality of robot controllers, it is necessary to change the operation programs individually, which is quite inconvenient to an operator.

SUMMARY OF THE INVENTION

It is therefore a principal object of the present invention to avoid the disadvantages of the prior art.

It is another object of the present invention to provide a mobile robot which enables a production line to be constructed easily according to the production while assuring the reliability and a production system using the same.

It is a further object of the invention to provide a robot system capable of altering an operation program for a mobile robot working at a given workstation on a production line easily.

According to the first invention of this application, there is provided a mobile robot executing a given operation on a workpiece supplied to a workstation is provided. The mobile robot includes: (a) a neighboring robot condition information collecting circuit collecting first information on an operating condition of a second mobile robot placed around said mobile robot; (b) a work information collecting circuit collecting second information on flow of workpieces on a production line; and (c) an action determining circuit determining an action based on said first and second information. This enables the mobile robot to determine its action so as to improve the efficiency of production based on operating conditions of neighboring mobile robots and flow of workpieces on a production line.

According to the second invention of the application, there is provided a production system which comprises: (a) a production line having a plurality of workstations at each of which one of processes is performed; (b) a transportation mechanism transporting a plurality of workpieces along said production line; and (c) a plurality of mobile robots. Each of the mobile robots executes a given operation on the workpiece transported by said transportation mechanism at an assigned one of the workstations and includes a neighboring robot condition information collecting circuit collecting information indicating whether another of the mobile robots is placed at the neighboring workstation and a determining circuit determining a process to be executed by the each of the mobile robots based on the information collected by said neighboring robot condition information collecting circuit.

In the preferred mode of the invention, said action determining circuit may determine a process to be executed by each of the mobile robots based on the information collected by said neighboring robot condition information collecting circuit.

Said action determining circuit may determine whether each of the mobile robots should be moved to another process or not based on the information collected by said neighboring robot condition information collecting circuit.

Each of the mobile robots further includes a work information collecting circuit collecting information on flow of the workpieces at the neighboring workstations. Said action determining circuit may determine whether a corresponding one of the mobile robots should be moved to another process or not based on the information collected by said work information collecting circuit.

Said action determining circuit may determine the process to be executed by a corresponding one of the mobile robots according to degrees of priority of said plurality of processes.

According to the third invention of this application, there is provided a robot system which comprises: (a) a storage circuit storing a plurality of operation programs for carrying out processes at workstations provided on a given production line; (b) a first transmission device transmitting workstation position signals each indicating a position of one of the workstations; (c) an output circuit responsive to each of the workstation position signals to output a corresponding one of the operation programs stored in said storage circuit; and (d) mobile robots each receiving one of the operation programs outputted from said output circuit corresponding to an assigned one of the workstations to take action according to the one of the operation programs.

In the preferred mode of the invention, said transmission device transmits each of the workstation position signals when one of the mobile robots is turned on at a corresponding one of the workstations.

Said output circuit is mobile communication equipment.

According to the third invention of this application, there is provided a method of taking measures against a change in production in production line including workstations at a given one of which a first mobile robot 1 is placed to carry out a given operation. This method comprises: (a) a first step of placing a second mobile robot at a selected one of the workstations of the production line according to an increase in production; (b) a second step of collecting first information on an operating condition of the first mobile robot; (c) a third step of collecting second information on flow of workpieces on said production line; and (d) a fourth step of determining an operation to be executed by the second mobile robot based on said first and second information.

In the preferred mode of the invention, the method further comprises a fifth step of selecting one of a plurality of operation programs corresponding to the operation determined in said fourth step and a sixth step of executing the selected one of the operation programs to work the second mobile robot.

The method may further comprise a fifth step of transmitting a request signal requesting an operation program to be performed by said second mobile robot at the workstation at which the second mobile robot is placed and a sixth step of outputting the operation program in response to said request signal. Said fourth step may initiate a download of the operation program outputted in said sixth step to said second mobile robot to work said second mobile robot according to the downloaded operation program.

BRIEF DESCRIPTION OF THE DRAWINGS

The present invention will be understood more fully from the detailed description given hereinbelow and from the accompanying drawings of the preferred embodiments of the invention, which, however, should not be taken to limit the invention to the specific embodiments but are for the purpose of explanation and understanding only.

In the drawings:

FIGS. 6(1) to 6(13) are views which show assembly processes of a starter fabricated by a production system;

DESCRIPTION OF THE PREFERRED EMBODIMENTS

An embodiment in which the present invention is used with an automatic production system for an automotive starter will be described below.

Figure 1:
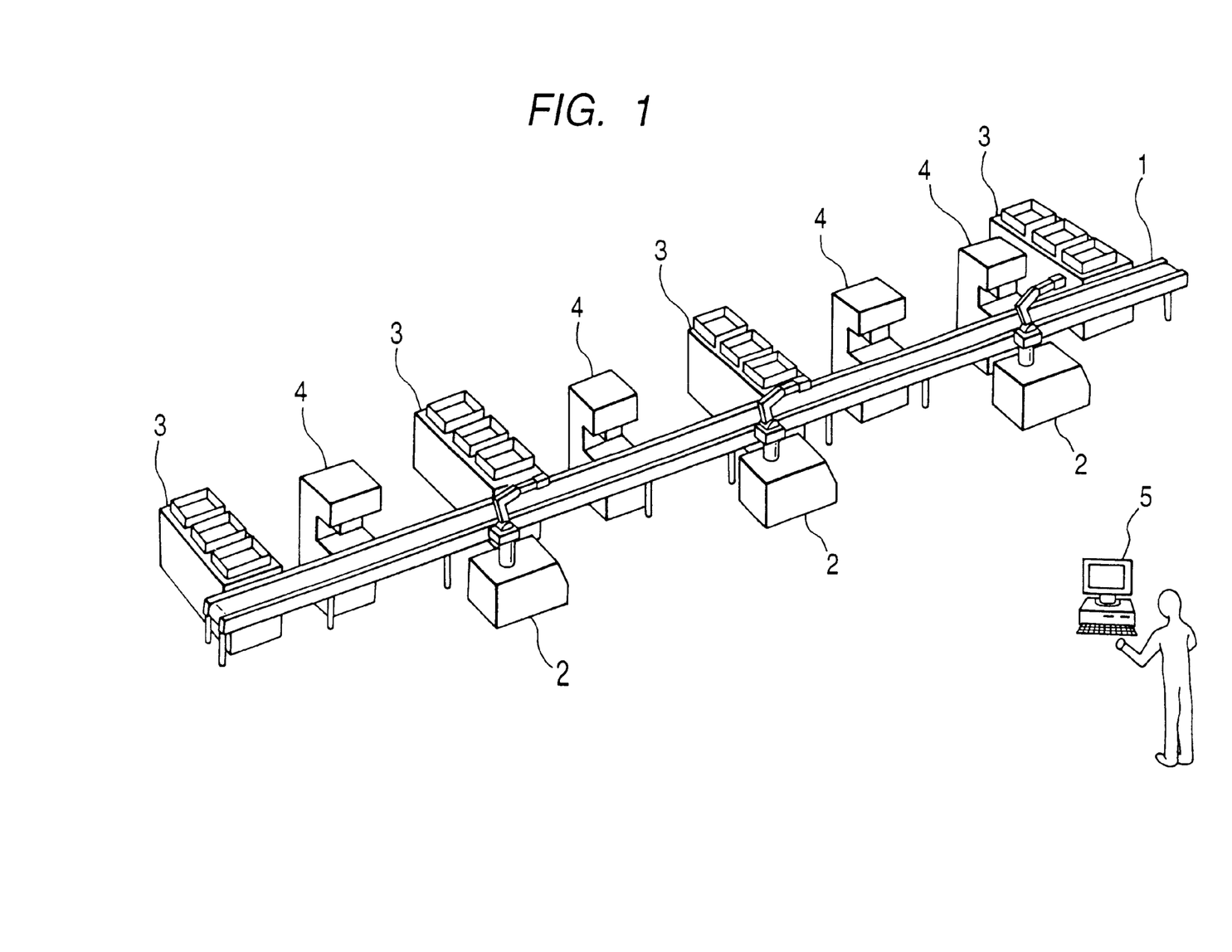
FIG. 1 is a perspective view which shows a production line on which mobile robots are disposed according to the present invention.

FIG. 1 shows the production system which generally includes a free-flow conveyer 1, mobile robots 2, universal parts feeding units 3, universal assembling units 4, and a control system 5 and which is actuated and controlled by an operator.

The mobile robots 2 are each implemented by an universal unit designed to move to a given workstation independently to perform assembling, parts supplying, and inspecting operations automatically. The universal unit consists of an automatic guided carriage and a robot mounted thereon. The universal unit works so as to keep effective production in cooperation with the other mobile robots 2 and is designed to adapt to the production of starters and a change in production period. The mobile robots 2 are also capable of moving to another production system to work in assembling processes thereof and may do a job in cooperation with the parts feeding units 3 and the assembling units 4.

Figure 2:
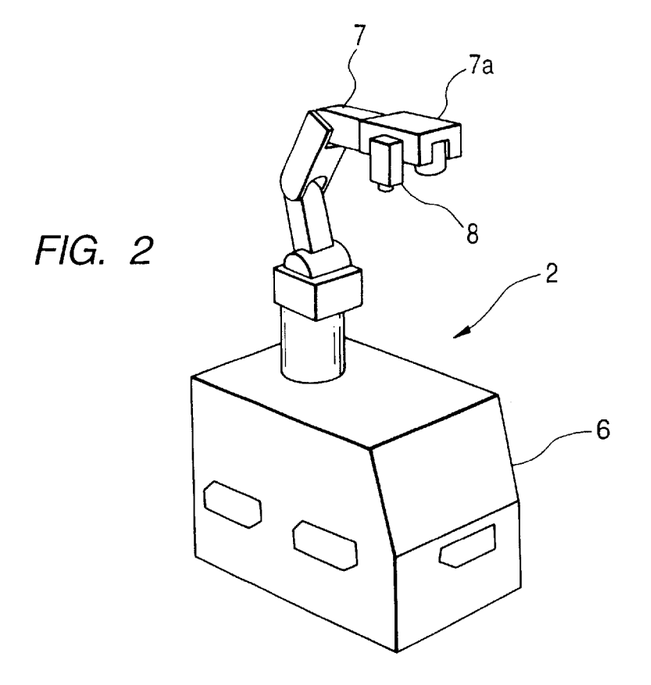
FIG. 2 is a perspective view of a mobile robot.
Figure 3:
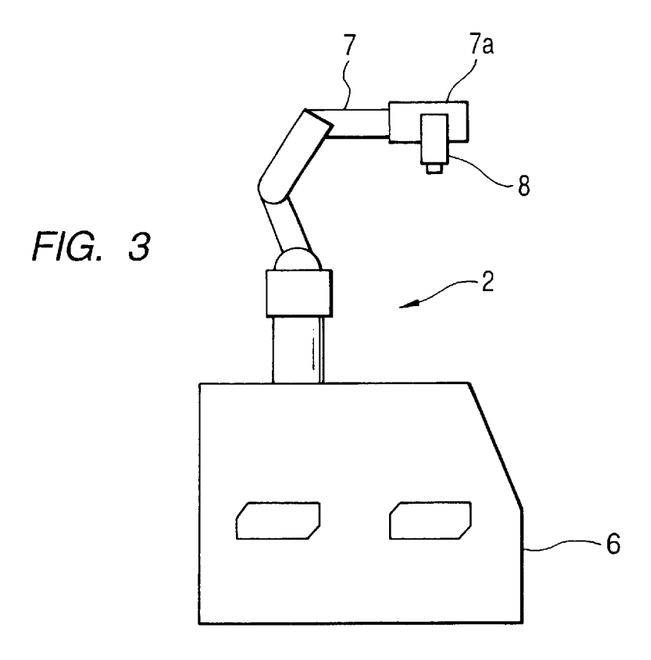
FIG. 3 is a side view of a mobile robot.

FIG. 2 is a perspective view which shows each of the mobile robots 2. FIG. 3 is a side view which shows each of the mobile robots 2. The mobile robots 2 each consist of a movable carriage 6 and a robot 7 mounted thereon. On a chucking hand 7a of the robot 7, a CCD camera 8 is installed. The robot 7 has a vision system which perceives an image captured by the CCD camera 8.

The basic structure of the robot 7 is of a six-axis type shown in table 1 below. An arm stroke is 900 mm. A maximum lifting load is 5 Kg. The robot 7 has the vision system, a robot-to-robot communication function, off-line teaching, and a monitoring function as an autonomy function, a cooperation function, a succession function, and a control function, respectively.

| Item | Specification |
| --- | --- |
| Basic Structure | |
| number of arm controlled axes | 6 degrees (6 axes) |
| arm stroke | 900 mm |
| maximum lifting weight | 5 kg |
| autonomy function | vision system etc. |
| cooperation function | machine-to-machine communication |
| succession function | off-line teaching etc. |
| control function | monitoring function etc. |

In the assembling production system of this embodiment, assembling components flow in one direction. The free-flow conveyer 1 is so controlled as to transport the assembly components in one direction in order to achieve the first-in first-out. In a normal operation, the free-flow conveyer 1 intermittently transports pallets 10 (see FIG. 4) on which workpieces 9 are disposed for enabling the operation of the mobile robots 2. The free-flow conveyer 1 is also designed to transport the pallets 10 continuously in a case where a production plan is altered suddenly, and it is required for the human operator to execute the assembling operations instead of the machines. Specifically, the free-flow conveyer 1 is so designed as to perform both a continuous transportation function suitable for human operations and an intermittent transportation function suitable for machine operations.

Figure 4:
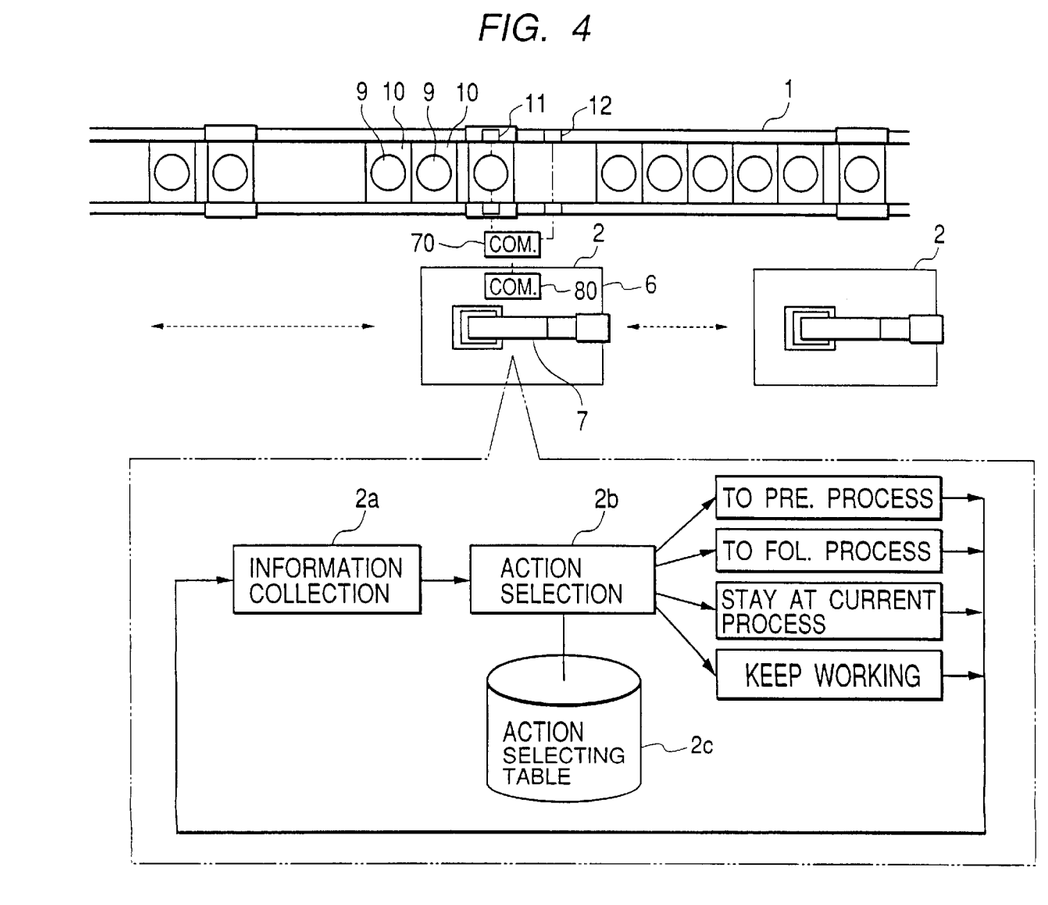
FIG. 4 is a plan view which shows a production line.

In each workstation at which the free-flow conveyer 1 is disposed, a process workpiece position sensor 11 and a following process workpiece full load sensor 12 are, as shown in FIG. 4, installed. Each of the process workpiece position sensors 11 detects the presence of the workpiece 9 at a corresponding one of the workstations. The following process workpiece full load sensor 12 detects a fully loaded condition where the conveyer 1 is fully loaded with the workpieces 9 forwarded to a following process. Both the sensors 11 and 12 transmit signals indicative of results of detection to a neighboring one of the mobile robots 2 through an optical communication device 70.

Each of the mobile robots 2 has disposed thereon an optical communication device 80 which receives the signals from the current process workpiece position sensor 11 and the following process workpiece full load sensor 12 to obtain information indicated by the signals and which also obtains positional information on the neighboring mobile robots 2 through the optical communication devices 80 mounted thereon.

The universal parts feeding units 3 are each made of a module designed to supply assembly components in cooperation with the mobile robots 2 and thus re-constructed easily.

The universal assembling units 4 are each made of a module designed to cooperate with the mobile robots 2 to perform an assembling operation such as press-fitting which is difficult in performance for the mobile robots 2 and thus re-constructed easily.

The control system 5 serves to re-construct the system according to a change in production and manages resources of the running system effectively with aid of rate-of-operation maintaining and improving activities of the system.

The human operator controls the above described units and, when the production is altered, supports indirect work such as a work schedule change for establishing effective operation of the system. When the assembling operation which is difficult to perform automatically is required, the operator may do it directly.

In the production system, ID tags (not shown) are embedded in floor surfaces at the workstations. In each ID tag, a program number indicating an operation of the arm of the mobile robot 2 at a corresponding one of the workstations is written. Each of the mobile robots 2 reads the program number out of one of the ID tags and performs the operation at a corresponding one of the workstations.

Each of the mobile robots 2 includes, as shown in FIG. 1, an information collecting circuit 2a, an action selecting circuit 2b, and an action selecting table 2c. Upon arriving at an assigned one of the workstations, each of the mobile robots 2 receives signals from the process workpiece position sensor 11, the following process workpiece full load sensor 12, and the other mobile robots 2 working in preceding and following processes through the information collecting circuit 2a to obtain information about conditions of the workpieces and the other mobile robots 2 required to determine the action. Next, the mobile robot 2 compares the obtained information with the action selecting table 2c, as will be described later in detail, in the action selecting circuit 2b to determine a subsequent action. Specifically, the feature of each of the mobile robots 2 is that it is made of an autonomously distributed unit capable of determining its own action based on the information obtained from the neighborhood.

Figure 5:
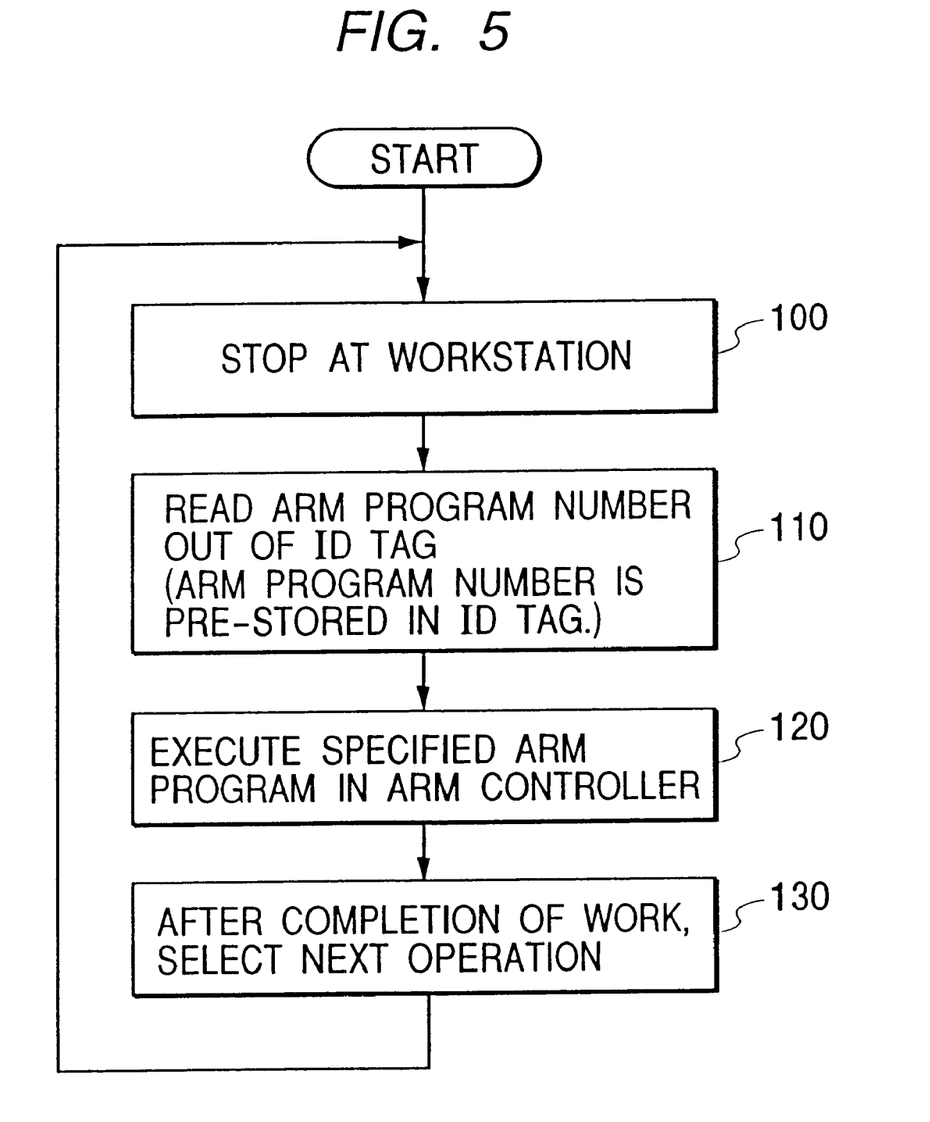
FIG. 5 is a flowchart which shows an operation of a mobile robot.
Figure 6:
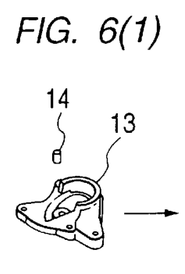

FIG. 5 is a flowchart indicating a basic operation of each of the mobile robots 2.

First, in step 100, the mobile robot 2 is moved to and stopped at a selected one of the workstations. The routine proceeds to step 110 wherein the mobile robot 2 reads the program number out of the ID tag for the arm operation. The ID tag, as described above, stores therein the program number for the arm operation.

The routine proceeds to step 120 wherein the arm controller installed in each of the mobile robots 2 executes a program specified by the read program number. Finally, the routine proceeds to step 130 wherein after completion of the operation, the mobile robot 2 travels to a next one of the workstations as required.

Figure 7:
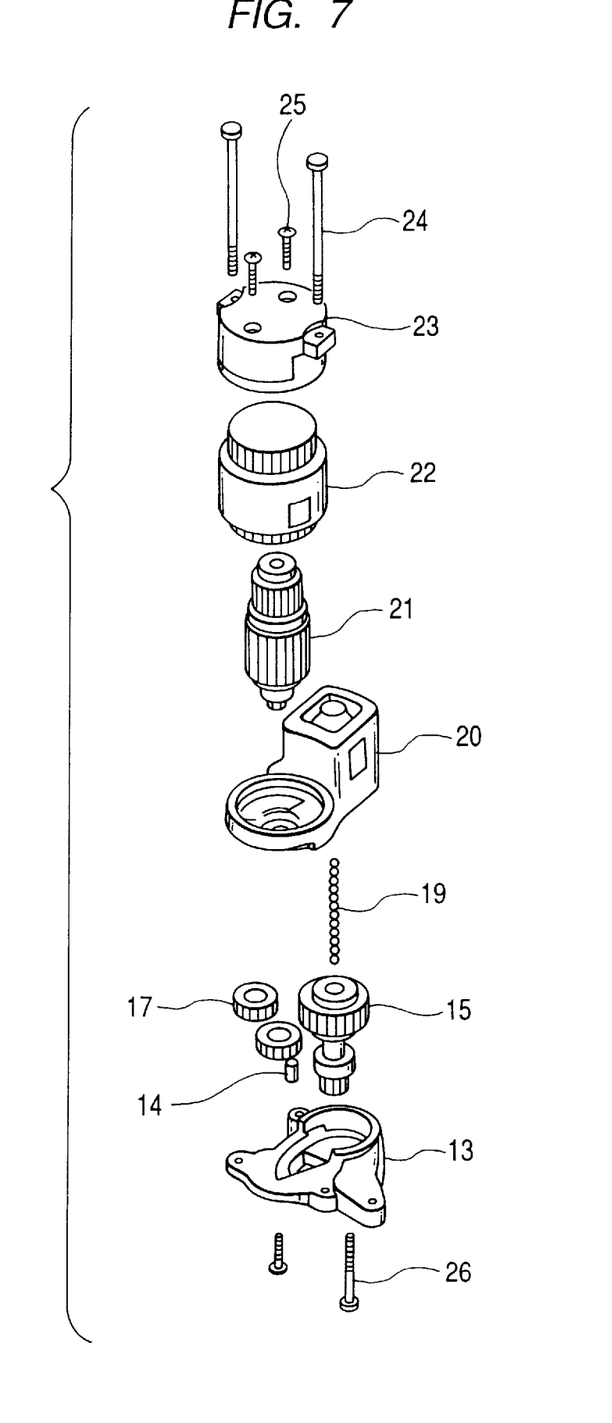
FIG. 7 is an exploded perspective view of a starter.

FIGS. 6(1) to 6(13) show production processes of a starter fabricated by the production system of this embodiment. FIG. 7 is an exploded perspective view of the starter.

Each starter is assembled through steps (1) to (13) as discussed below.

(1) Press a housing pin 14 into a body 13.
(2) Build a clutch 15 into the body 13.
(3) Build a retainer 16 into the body 13.
(4) Build a gear 17 into the body 13.
(5) Build a steel ball 18 and a spring 19 into the body 13.
(6) Build a magnet switch 20 into the body 13.
(7) Build an armature 21 into the body 13.
(8) Build a yoke into the body 13.
(9) Build an end frame 23 into the body 13.
(10) Insert steel bolts 24.
(11) Fasten the steel bolts 24.
(12) Fasten end frame vises 25.
(13) Fasten housing bolts 26.

As described above, the production processes of the starter involve a combination of press-fitting, assembling, and fastening processes which builds a plurality of parts into the body 13 mounted as the workpiece 9 on the pallet 10. In the press-fitting and fastening processes, the universal assembling units 4 such as screw fastening machines are used. Specifically, it is difficult for the mobile robots 2 to perform the press-fitting and fastening operations in the press-fitting and fastening processes, therefore the universal assembling units 4 made of press-fitting and fastening units are used.

Next, operations of the production system in three cases where the system is in a steady state, the system is in an unsteady state or abnormal state, and a manual operation is required will be described below.

Steady State

Figure 8:
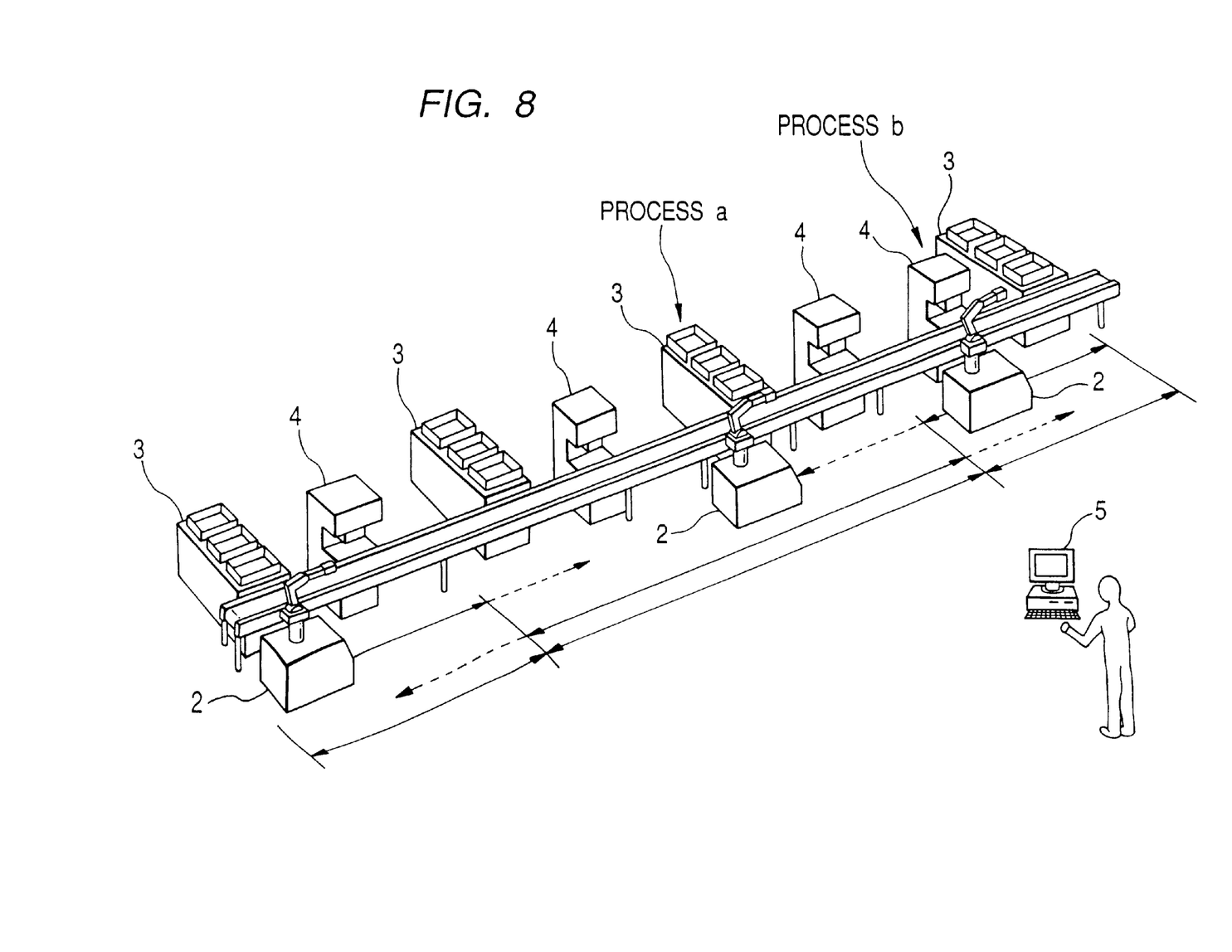
FIG. 8 is a perspective view of a production line which shows a moving range of a mobile robot.

In the steady state, the production system, as shown in FIG. 8, performs, for example, a process a (an assembling process using the mobile robot 2 and the universal parts feeding unit 3) and a process b (an assembling process using the mobile robot 2 and the universal assembling unit 4).

(a) First, the pallet 10 on which the workpiece 9 is mounted is transported by the free-flow conveyer 1 from a preceding process to the workstation at which the process a is to be executed and then positioned. The universal parts feeding unit 3 starts to supply assembly components to the workpiece 9.

(b) Each of the mobile robots 2 takes charge of a plurality of processes and monitors the state of the mobile robots 2 in the preceding and following processes so that it may decide a destination autonomously and move between the processes. The two or more mobile robots 2, as the case may be, execute the same process in cooperation with each other.

(c) When the mobile robot 2 takes charge of the process a, it checks the position of the assembly component through the vision system and then picks up the assembly component to built it into the workpiece 9 on the pallet 10.

(d) After assembly, the mobile robot 2 or an auxiliary jig performs inspection (assembly check etc.) automatically.

(e) After completion of the assembly, the pallet 10 on which the workpiece 9 is mounted is transported by the free-flow conveyer 1 toward a following process.

(f) The mobile robot 2 determines the next job (i.e., determines whether the mobile robot 2 should keep working in the current process or move to a preceding or a following process) and starts action.

(g) When it is required for the mobile robot 2 to move to the following process, the mobile robot 2 replaces its hand with one used in the following process during traveling for increasing the efficiency of operation.

(h) It is impossible for the mobile robot 2 by itself to perform an operation in the process b. The mobile robot 2, thus, performs the operation in cooperation with the universal assembling unit 4. Specifically, the mobile robot 2 presses a start switch of the universal assembling unit 4 in the same manner as a human operator to start the operation.

The mobile robot 2 makes in the above step (f) the determination of whether the mobile robot 2 should move to the next workstation or not based on the condition of flow of the workpieces 9 and the positions of the other mobile robots 2 (i.e., when determined, locations to which the other mobile robots 2 are to be moved next, otherwise, current locations of the other mobile robots 2) in the following manner.

Figure 9:
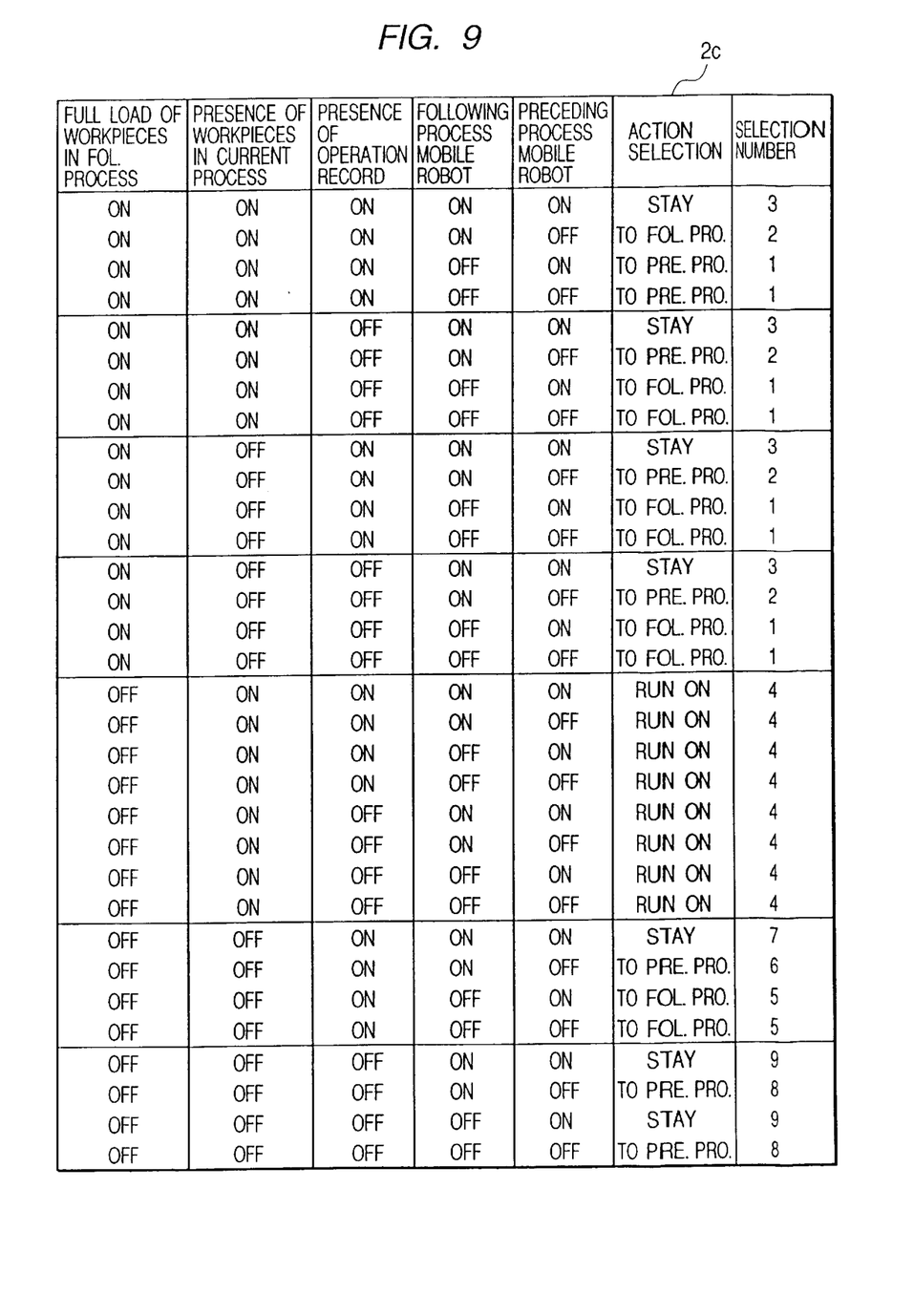
FIG. 9 is a view which shows an operation selecting table for a mobile robot.

FIG. 9 shows the action selecting table 2c. The action selecting table 2c lists therein data for selection of actions of the mobile robots 2 and is stored in the mobile robots 2. The selection of one of the actions is made based on determinations of whether a following process is loaded fully with workpieces or not, whether a workpiece is placed in a current process or not, whether there is an operation record or not, whether another mobile robot is in a following process or not, and whether another mobile robot is in a preceding process or not. As the actions to be selected, there are provided movement to a following process, movement to a preceding process, stay, and continuation of an operation, to which selection numbers are assigned, respectively. "on" labeled in a column "Full load of workpieces in fol.process" of the action selecting table 2c represents a condition in which a following process is fully loaded with the waiting workpieces 9. "on" labeled in a column "Presence of workpiece in current process" represents the presence of the workpiece 9 in a current process. "on" labeled in a column "presence of operation record" represents completion of an operation in the current process. "on" labeled in a column "Following process mobile robot" represents the presence of the mobile robot 2 in the following process. "on" labeled in a column "Preceding process mobile robot" represents the presence of the mobile robot 2 in a preceding process. "To fol. pro." labeled in a column "Action Selection" indicates a command to move the mobile robot 2 to a following process. "To pre. pro." indicates a command to move the mobile robot 2 to a preceding process. "Stay" indicates a command for the mobile robot 2 to stay in the current process. "Run on" indicates a command to keep the mobile robot 2 working in the current process.

Specifically, a combination of "on" and "off" in the action selecting table 2c represents a work scheme for determining an action pattern of each of the mobile robots 2. The contents of the action selecting table 2c may be rewritten through the control system 5 to modify the way the mobile robots 2 cooperate with each other for determining the weight given to a preceding process, a current process, and a following process.

Figure 10:
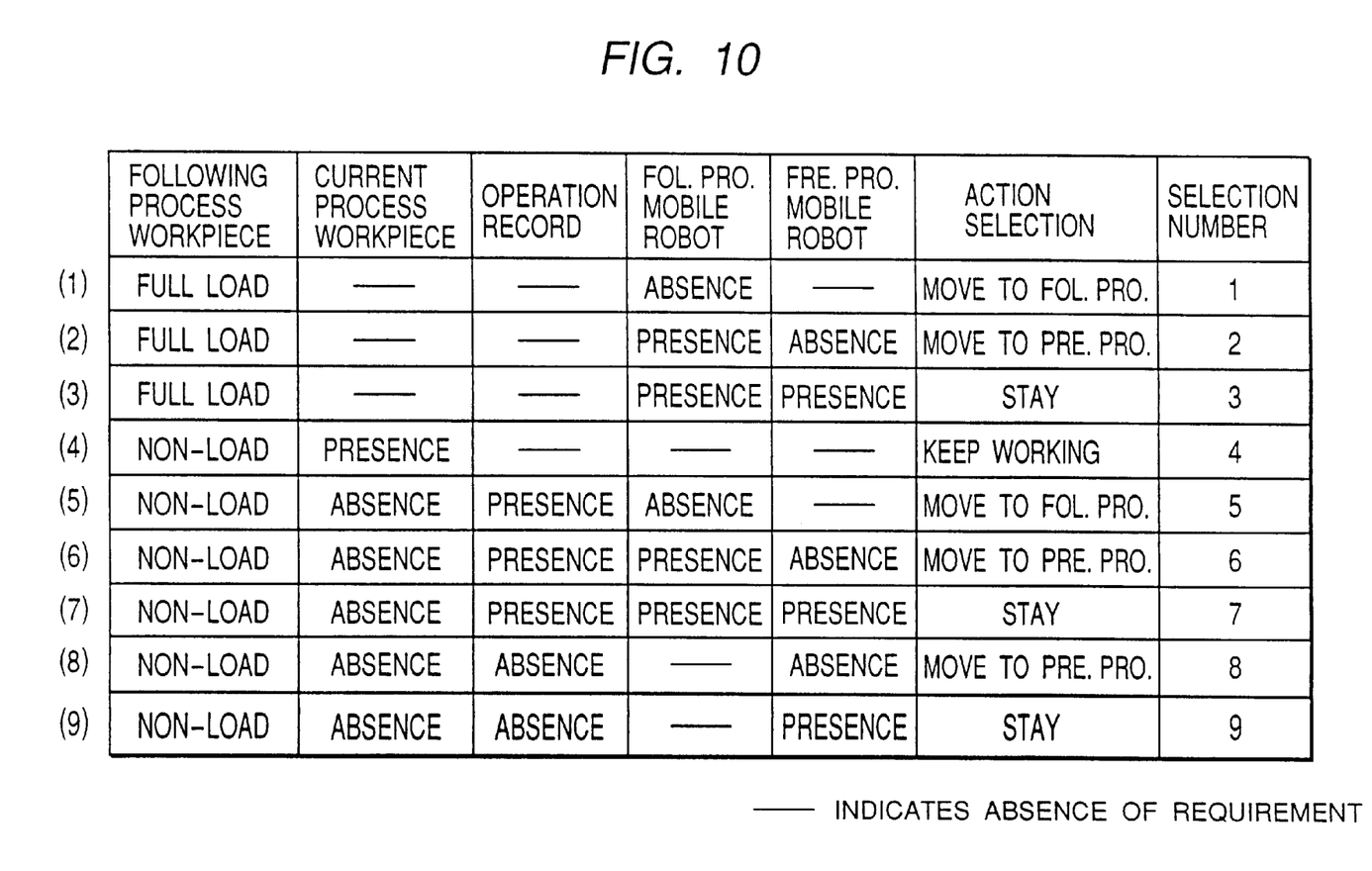
FIG. 10 is a view which shows the contents of the operation selecting table in FIG. 9.

FIG. 10 shows combinations of requirements for selection of the actions in the action selecting table 2c. The actions of the mobile robots 2 determined by the combinations of requirements will be discussed below.

(1) If a following process is fully loaded with the workpieces 9 in the absence of any of the mobile robots 2, the mobile robot 2 moves from the current process to the following process regardless of other requirements (selection number=1). Specifically, the mobile robot 2 is allowed to work in the current process, but it is impossible to forward the workpiece 9 to the following process, therefore the mobile robot 2 moves to the following process for handling the workpieces 9 fully loaded in the following process.

(2) If the following process is fully loaded with the workpieces 9 in the presence of another mobile robot 2, and there is no mobile robots 2 in a preceding process, the mobile robot 2 moves to the preceding process regardless of other requirements (selection number=2). Specifically, the mobile robot 2 is allowed to work in the current process, but it is impossible to forward the workpiece 9 to the following process, therefore the mobile robot 2 moves to the preceding process for the time being.

(3) If the following process is fully loaded with the workpieces 9 in the presence of the other mobile robots 2 both in the preceding and following processes, the mobile robot 2 stays in the current process regardless of other requirements (selection number=3). Specifically, the mobile robot 2 is allowed to work in the current process, but it is impossible to forward the workpiece 9 to the following process, therefore the mobile robot 2 stays at the current workstation.

(4) If the following process is not yet loaded fully with the workpieces 9, and the workpiece 9 still exists in the current process, the mobile robot 2 continues to work in the current process regardless of other requirements (selection number=4). Specifically, the mobile robot 2 runs on at the current process to forward the workpiece 9 to the following process.

(5) If the following process is fully loaded with the workpieces 9 in the absence of the workpiece 9 in the current process, there is the operation record, and any of the mobile robots 2 are absent from the following process, the mobile robot 2 moves to the following process regardless of whether another mobile robot 2 is present at the preceding process or not (selection number =5). Specifically, after completion of assembly in the current process, the workpiece 9 has been forwarded to the following process, therefore the mobile robot 2 moves to the next workstation to work thereat.

(6) If the following process is not yet loaded fully with the workpieces 9 in the absence of the workpieces 9 in the current process, there is the operation record, and another mobile robot 2 is present at the following process in the absence of any of the mobile robots 2 in the preceding process, the mobile robot 2 moves to the preceding process (selection number=6). Specifically, after completion of assembly in the current process, the workpiece 9 has been forwarded to the following process, but another mobile robot 2 is now working in the following process, therefore the mobile robot 2 moves to the preceding process for the time being.

(7) If the following process is not yet loaded fully with the workpieces 9 in the absence of the workpieces 9 in the current process, there is the operation record, and the other mobile robots 2 are present both at the following and preceding processes, the mobile robot 2 stays in the current process (selection number=7). Specifically, after completion of assembly in the current process, the workpiece 9 has been forwarded to the following process, but the other mobile robots 2 are now working in the preceding and following process, therefore the mobile robot 2 stays at the current workstation.

(8) If the following process is not yet loaded fully with the workpieces 9 in the absence of the workpieces 9 in the current process, there is no operation record, and any of the mobile robots 2 are absent from the preceding process, the mobile robot 2 moves to the preceding process regardless of presence of another mobile robot 2 in the following process (selection number=7). Specifically, the workpiece 9 is not supplied from the preceding process to the current process. The mobile robot 2, thus, moves to the workstation of the preceding process to work thereat.

(9) If the following process is not yet loaded fully with the workpieces 9 in the absence of the workpieces 9 in the current process, there is no operation record, and another mobile robot 2 is present in the preceding process, the mobile robot 2 stays in the current process regardless of presence of another mobile robot 2 in the following process (selection number=9). Specifically, the workpiece 9 is not supplied from the preceding process to the current process, but another mobile robot 2 is present in the preceding process, therefore, the mobile robot 2 stays at the current workstation.

If another requirement is met during each of the above operations, each of the mobile robots 2 immediately stops the current operation and starts a corresponding action.

By the above control, the construction of the production system using the autonomously distributed mobile robots 2 is established. Each of the mobile robots 2 is designed to move to one of the workstations, as specified by the action selecting table as a function of flow of the workpieces 9 on the production line and locations of the other mobile robots 2, to execute the assembling operation. Accordingly, use of the mobile robots 2 of a number corresponding to the production in the production system realizes flexible automatic production.

Figure 11:
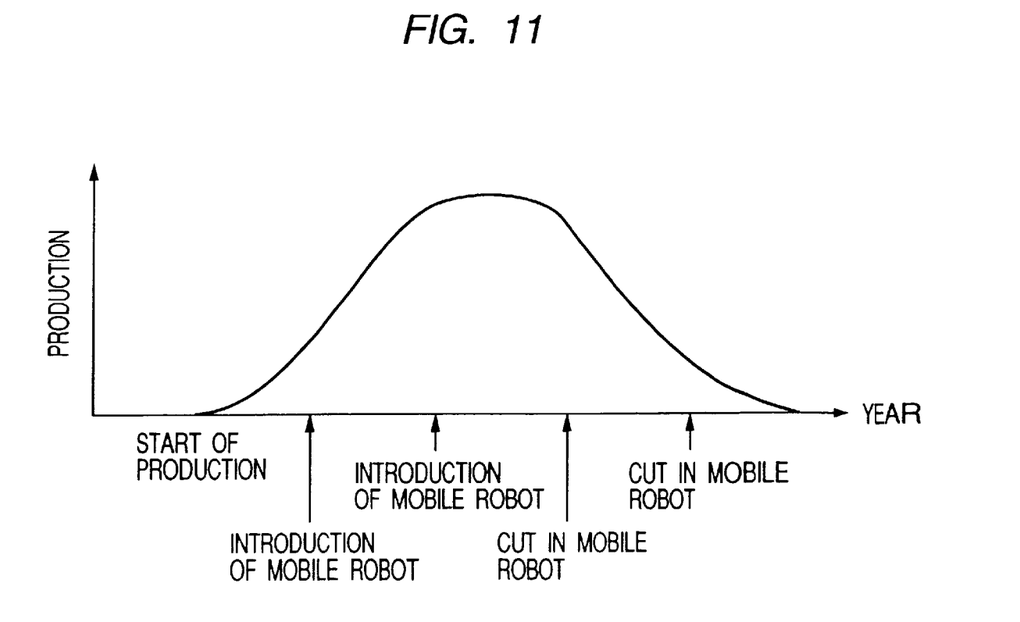
FIG. 11 is a graph which shows a time-sequence change in production.

Generally, the production of typical automobiles, as shown in FIG. 11, increases gradually from the start of manufacture and, after a minor change of the automobiles, decreases gradually. In a conventional automatic production line, a production system has the mobile robots 2 built fixedly and thus cannot deal with a change in production of products flexibly. The production system of this embodiment is, however, capable of regulating the number of the mobile robots 2 according to the production and also supplying some of the mobile robots 2 which become unnecessary in this production system to another production system, which increases the serviceability ratio.

If one of the mobile robots 2 is failed, the production system may be restored quickly by replacing it.

Unsteady State/Abnormal State

When the production line is at rest for a period of time such as the noon recess during which the operation is stopped temporarily, specified some of the mobile robots 2 travel in a factory to perform indirect operations (parts arrangement operation etc.) distributed in the factory through 24 hours, thereby increasing serviceability ratio of the mobile robots 2.

If a failure of facilities has occurred which may lead to assembling errors, the mobile robot 2 first retries the operation to determine whether it is possible for the mobile robot 2 to cure the failure by itself or not. If a positive answer is obtained, the mobile robot 2 cure it by itself. Alternatively, if a negative answer is obtained, the mobile robot 2 informs the human operator of occurrence and details of the failure by radio and cooperates with the operator to cure the failure rapidly. Specifically, the human and the mobile robots 2 do jobs in cooperation with each other under various safety measures (e.g., use of low-voltage output units, shaping of safe arms). For long-term steady operations of the mobile robots 2, self-diagnosis techniques are also used. The mobile robots 2 may perform tests to analyze troubles (troubles of arms, a traveling system, a visual system, etc.) by itself to estimate additional troubles in early stages and urge the operator to take measures.

Manual Operation

The production system of this embodiment is basically automated, but the assembling operation may involve difficult works peculiar thereto such as assembling of soft parts. Therefore, because of a short production period or delay of development of automation techniques, the production system may require a manual assembling operation. The production system of this embodiment is, like a manual operation line, a highly autonomous production system and thus suitable for cooperation of the mobile robots 2 with a human. The operation of the production system when the manual operation is required will be described below.

Basically, a person performs the above described operations (a) to (h) in the steady state instead of the mobile robots 2. However, it is advisable that the free-flow conveyer 1 be run at a constant speed to transport the pallets 10 carrying the workpieces 9 thereon continuously.

When the system returns to the automatic operation mode, it is possible to return the free-flow conveyer 1 to the intermittent operation mode easily.

The universal parts feeding units 3 and the universal assembling units 4 are so designed as to assure a person's safety and thus may also be employed in the manual operation.

The second embodiment of the production system will be described below.

The control system 5 of this embodiment also functions as a program server and stores therein robot operation programs each for one of the workstations. Each of the mobile robots 2 has disposed therein a PHS (Personal Handyphone System) data communication device 190 which establishes data communication with the control system 5. Specifically, each of the mobile robots 2 downloads thereto a corresponding one of the operation programs from the control system 5 through the PHS data communication device 190 and stars a corresponding operation at one of the workstations.

Figure 12:
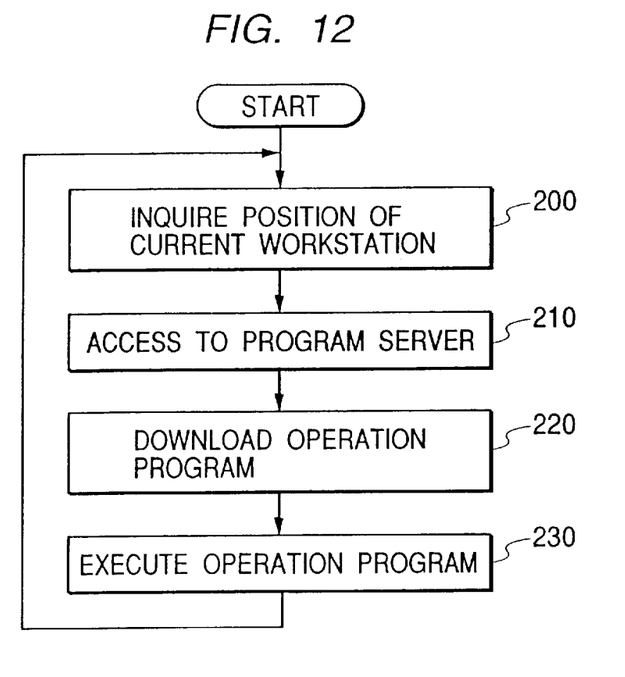
FIG. 12 is a flowchart which shows an operation of downloading an operation program for a mobile robot according to the second embodiment.

FIG. 12 shows a program executed to initiate a download of the operation program from the control system 5 when each of the mobile robots 2 is turned on at an assigned one of the workstations.

First, in step 200, the mobile robot 2 outputs a request signal to the optical communication device 195 installed on an assigned one of the workstations to inquire the position of its workstation. The optical communication device 195 is responsive to the request signal from the mobile robot 2 to output an answer signal indicative of its own ID number corresponding to the workstation.

Next, in step 210, upon reception of the answer signal indicative of the ID number from the optical communication device 195, the mobile robot 2 initiates access to the control system 5 through the PHS data communication device 190 to inform it of the ID number of the optical communication device 195. The PHS data communication device 190 utilizes a local area network. Upon reception of the ID number from the mobile robot 2, the control system 5 selects three of the operation programs stored therein which are to be executed in a process at one of the workstations at which the mobile robot is now placed, a preceding process, and a following process, respectively, and output them through the PHS data communication device.

In step 220, the mobile robot 2 downloads the selected operation programs from the control system 5 through the PHS data communication device 190.

In step 230, the mobile robots 2 starts the operation program to be executed at its own workstation.

Figure 13:
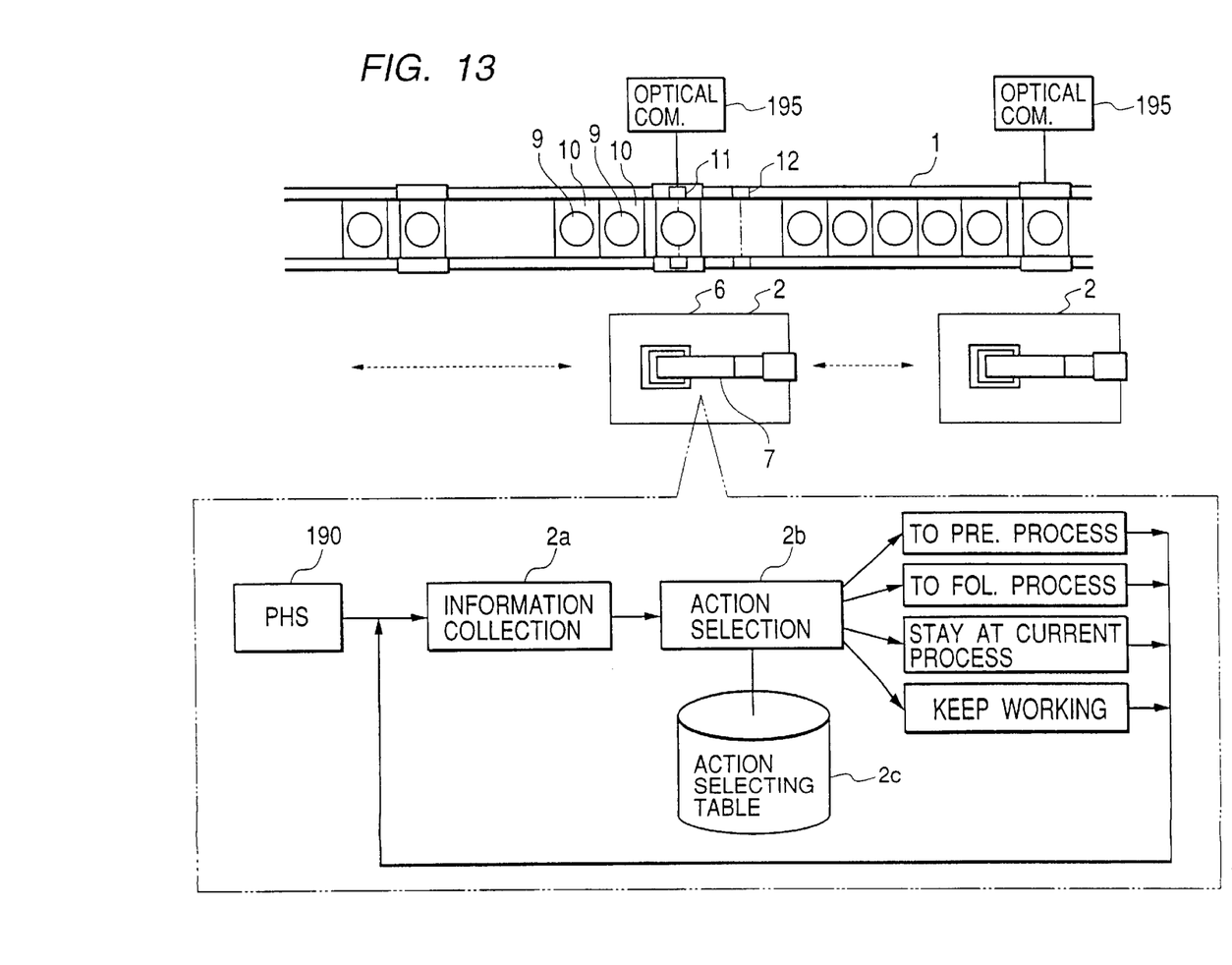
FIG. 13 is a plan view which shows a production line of the second embodiment.

When the operation programs are, as shown in FIG. 13, downloaded from the control system 5, each of the mobile robots 2, like the first embodiment, receives signals from the current process workpiece position sensor 11, the following process workpiece full load sensor 12 and the other mobile robots 2 placed in preceding and following processes through the information collecting circuit 2a to obtain information on conditions of the workpieces and the other mobile robots 2 needed to determine an action thereof. Next, the mobile robot 2 looks up the action selecting table 2c, as discussed in the first embodiment, using the obtained information and determines the next action.

Figure 14:
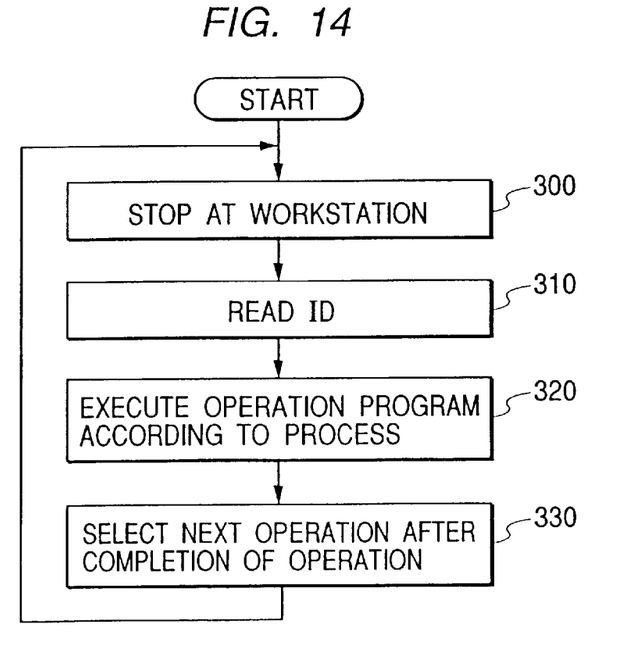
FIG. 14 is a flowchart of an operation of a mobile robot of the second embodiment.

FIG. 14 is a flowchart which shows a basic operation of each of the mobile robots 2.

First, in step 300, the mobile robot 2 moves to a selected one of the workstations. The routine proceeds to step 310 wherein the mobile robot 2 reads the ID number of the communication device 195 at the workstation.

Next, the routine proceeds to step 320 wherein one of the operation programs corresponding to the current workstation is executed. Finally, the routine proceeds to step 330 wherein after completion of the operation, the mobile robot 2 selects, like the first embodiment, an operation to be executed next.

Other arrangements and operations of the production system of this embodiment are identical with those in the first embodiment, and explanation thereof in detail will be omitted here.

As apparent from the above discussion, the operation programs for the mobile robots 2 are pre-installed in the control system 5 functioning as a program server. When placed at one of the workstations and turned on, each of the mobile robots 2 initiates a download of the operation program required at the workstation. This eliminates the need for the mobile robots 2 to pre-store the operation programs for all the workstations. It becomes possible to work each of the mobile robots 2 at an assigned workstation and preceding and following workstations only by placing the mobile robot 2 at the assigned workstation. For instance, in a case where it is required to increase the production, upon addition of a required number of the mobile robots to the production line, required operation programs are inputted automatically to each of the mobile robots 2, and corresponding operations are executed. This allows a program storage capacity of the mobile robots 2 to be decreased as compared with a system in which the mobile robots 2 install therein operation programs required at all the workstations.

The modification of the operation programs for each workstation may be made only by the control system 5, which allows the time required for the modification to be decreased greatly as compared with a system in which the operation programs are pre-installed in the mobile robots 2.

The communication between each of the mobile robots 2 and the control system 5 is established using the PHS data communication device, thereby allowing the local area network to be employed to provide for ease of the communication therebetween. The communication between each of the mobile robots 2 and the control system 5 may alternatively be established through the optical communication device used in communication between each of the mobile robots 2 and the equipment (the sensors 11 and 12, etc.).

The communication between the mobile robots 2 or between each of the mobile robots 2 and the equipment (the sensors 11 and 12, etc.) is not limited to the optical communication, but may be established by PHS data transmission.

The present invention is not limited to the above described embodiments, but may be embodied in various ways. For example, it is possible to use the present invention in a process in which a mobile robot sets and removes a workpiece on and from a press machine or a cutting machine.

The production line is not limited to a linear shape, but may be of U-shape or oval shape.

The communication between the mobile robots 12 or between each of the mobile robots 2 and the sensors may be established by radio.

The flow of the workpieces 9 may be determined by monitoring the presence of the workpieces 9 at a current process, the presence of the workpieces 9 at a preceding process, the presence of the other mobile robots 2 in the preceding and following processes, or the operation records. The flow of the workpieces 9 may also be determined by monitoring the presence of the workpieces 9 in the following process, the distance to the neighboring mobile robot 2, information indicating whether the neighboring mobile robot 2 is working or in a standby state, or information indicating that the neighboring mobile robot 2 has stayed for a constant period of time.

The selection of the actions may be made only by determining whether the requirements shown in FIG. 10 are met or not without use of the action selecting table 2c.

The operation to be executed by the mobile robot 2 on standby may be determined by determining whether requirements different from the ones shown in FIG. 10 are met or not when the mobile robot 2 is placed in the standby state.

All the mobile robots 2 need not have the same action selecting table 2c. For example, leading and trailing ones of the mobile robots 2 may have the action selecting tables 2c different from those installed in the other mobile robots 2. The action selecting tables 2c installed in some of the mobile robots 2 which travel at different speeds may be altered.

Each of the mobile robots 2 may be implemented by a four-axis robot or a robot equipped with a simple loader mechanism.

What is claimed is:

1. A mobile robot executing a given operation on a workpiece supplied to a workstation comprising:

a neighboring robot condition information collecting circuit collecting first information on an operating condition of a second mobile robot placed around said mobile robot;

a work information collecting circuit collecting second information on flow of workpieces on a production line; and an action determining circuit determining an action based on said first and second information.

2. A production system comprising:

a production line having a plurality of workstations at each of which one of processes is performed;

a transportation mechanism transporting a plurality of workpieces along said production line; and a plurality of mobile robots, each of the mobile robots executing a given operation on the workpiece transported by said transportation mechanism at an assigned one of the workstations, each of the mobile robots including, a neighboring robot condition information collecting circuit collecting information indicating whether another of the mobile robots is placed at the neighboring workstation, and a determining circuit determining a process to be executed by the each of the mobile robots based on the information collected by said neighboring robot condition information collecting circuit.

3. A production system as set forth in claim 2, wherein said action determining circuit determines whether each of the mobile robots should be moved to another process or not based on the information collected by said neighboring robot condition information collecting circuit.

4. A production system as set forth in claim 2, wherein each of the mobile robots further includes a work information collecting circuit collecting information on flow of the workpieces at the neighboring workstations, and wherein said action determining circuit determines whether a corresponding one of the mobile robots should be moved to another process or not based on the information collected by said work information collecting circuit.

5. A production system as set forth in claim 2, wherein said action determining circuit determines the process to be executed by a corresponding one of the mobile robots according to degrees of priority of said plurality of processes.

6. A robot system comprising:

a storage circuit storing a plurality of operation programs for carrying out processes at workstations provided on a given production line;

a first transmission device transmitting workstation position signals each indicating a position of one of the workstations;

an output circuit responsive to each of the workstation position signals to output a corresponding one of the operation programs stored in said storage circuit; and mobile robots each receiving one of the operation programs outputted from said output circuit corresponding to an assigned one of the workstations to take action according to the one of the operation programs.

7. A robot system as set forth in claim 6, wherein said transmission device transmits each of the workstation position signals when one of the mobile robots is turned on at a corresponding one of the workstations.

8. A robot system as set forth in claim 6, wherein said output circuit is mobile communication equipment.

9. A method of taking measures against a change in production in production line including workstations at a given one of which a first mobile robot 1 is placed to carry out a given operation comprising:

a first step of placing a second mobile robot at a selected one of the workstations of the production line according to an increase in production;

a second step of collecting first information on an operating condition of the first mobile robot;

a third step of collecting second information on flow of workpieces on said production line; and a fourth step of determining an operation to be executed by the second mobile robot based on said first and second information.

10. A method as set forth in claim 9, further comprising a fifth step of selecting one of a plurality of operation programs corresponding to the operation determined in said fourth step and a sixth step of executing the selected one of the operation programs to work the second mobile robot.

11. A method as set forth in claim 9, further comprising a fifth step of transmitting a request signal requesting an operation program to be performed by said second mobile robot at the workstation at which the second mobile robot is placed and a sixth step of outputting the operation program in response to said request signal, and wherein said fourth step initiates a download of the operation program outputted in said sixth step to said second mobile robot to work said second mobile robot according to the downloaded operation program.

* * * * *